(12) United States Patent
Nakamura et al.

(10) Patent No.: US 9,337,473 B2
(45) Date of Patent: May 10, 2016

(54) POSITIVE ELECTRODE ACTIVE MATERIAL, POSITIVE ELECTRODE FOR NONAQUEOUS ELECTROLYTE BATTERY, AND NONAQUEOUS ELECTROLYTE BATTERY

(71) Applicant: SANTOKU CORPORATION, Kobe-shi, Hyogo (JP)

(72) Inventors: Kazuhiko Nakamura, Takarazuka (JP); Tetsu Fujiwara, Kobe (JP); Akihito Kaneko, Kobe (JP)

(73) Assignee: SANTOKU CORPORATION, Hyogo (JP)

( * ) Notice: Subject to any disclaimer, the term of this patent is extended or adjusted under 35 U.S.C. 154(b) by 0 days.

(21) Appl. No.: 14/321,879

(22) Filed: Jul. 2, 2014

(65) Prior Publication Data

US 2014/0349188 A1   Nov. 27, 2014

Related U.S. Application Data

(63) Continuation of application No. 11/997,480, filed as application No. PCT/JP2006/315187 on Aug. 1, 2006, now abandoned.

(30) Foreign Application Priority Data

Aug. 1, 2005   (JP) .................................. 2005-248378
Feb. 8, 2006   (JP) .................................. 2006-030428

(51) Int. Cl.

| | | |
|---|---|---|
| *H01M 4/131* | (2010.01) | |
| *B82Y 30/00* | (2011.01) | |
| *C01G 51/04* | (2006.01) | |
| *C01G 51/00* | (2006.01) | |
| *C01G 53/00* | (2006.01) | |
| *H01M 4/485* | (2010.01) | |
| *H01M 4/525* | (2010.01) | |
| *C01G 45/00* | (2006.01) | |
| *C01G 49/00* | (2006.01) | |
| *H01M 10/0525* | (2010.01) | |
| *H01M 4/58* | (2010.01) | |
| *H01M 4/02* | (2006.01) | |

(52) U.S. Cl.
CPC ............... *H01M 4/131* (2013.01); *B82Y 30/00* (2013.01); *C01G 45/006* (2013.01); *C01G 49/009* (2013.01); *C01G 51/04* (2013.01); *C01G 51/42* (2013.01); *C01G 53/42* (2013.01); *H01M 4/485* (2013.01); *H01M 4/525* (2013.01); *H01M 10/0525* (2013.01); *C01P 2002/52* (2013.01); *C01P 2002/60* (2013.01); *C01P 2002/72* (2013.01); *C01P 2002/77* (2013.01); *C01P 2002/88* (2013.01); *C01P 2004/03* (2013.01); *C01P 2004/32* (2013.01); *C01P 2004/50* (2013.01); *C01P 2004/51* (2013.01); *C01P 2004/61* (2013.01); *C01P 2004/62* (2013.01); *C01P 2004/64* (2013.01); *C01P 2004/80* (2013.01); *C01P 2006/32* (2013.01); *C01P 2006/40* (2013.01); *H01M 4/58* (2013.01); *H01M 2004/028* (2013.01); *Y02E 60/122* (2013.01); *Y02T 10/7011* (2013.01)

(58) Field of Classification Search
CPC ..... H01M 4/131; H01M 4/485; H01M 4/525; H01M 4/58; H01M 10/0525; H01M 2004/028; C01G 53/42; C01G 51/42; C01G 51/04; C01G 45/006; C01G 49/009; C01P 2004/80; C01P 2004/64; C01P 2004/51; C01P 2004/61; C01P 2004/62; C01P 2004/03; C01P 2004/028; C01P 2004/50; C01P 2004/32; C01P 2006/40; C01P 2002/72; C01P 2002/88; C01P 2002/77; C01P 2002/52; B82Y 30/00; Y02E 60/122; Y02T 10/7011

USPC ................... 252/182.1, 519.1, 519.12, 519.5, 252/519.51, 519.54, 520.2, 520.21, 520.22, 252/520.4, 520.5; 429/209, 218.1, 231.5, 429/231.6, 231.95, 304; 423/179, 579, 423/592.1, 593.1, 598, 594.15, 624, 625, 423/641; 136/205

See application file for complete search history.

(56) References Cited

U.S. PATENT DOCUMENTS

| | | | |
|---|---|---|---|
| 6,589,694 B1 * | 7/2003 | Gosho et al. | 429/231.1 |
| 2002/0142222 A1 * | 10/2002 | Nishida et al. | 429/231.3 |
| 2002/0164528 A1 | 11/2002 | Sunagawa et al. | |
| 2004/0023113 A1 * | 2/2004 | Suhara et al. | 429/231.1 |
| 2005/0069774 A1 | 3/2005 | Miyazaki et al. | |
| 2006/0204852 A1 | 9/2006 | Nishida et al. | |

FOREIGN PATENT DOCUMENTS

| | | | | |
|---|---|---|---|---|
| CN | 1431972 | A | 7/2003 | |
| EP | 1246279 | A2 | 10/2002 | |
| EP | 1391949 | * | 2/2004 | H01M 4/48 |
| EP | 1391949 | A2 | 2/2004 | |
| JP | 10-312805 | A | 11/1998 | |
| JP | 2002-231222 | A | 8/2002 | |
| JP | 2002-246027 | A | 8/2002 | |
| JP | 2002-251996 | A | 9/2002 | |
| JP | 2005-044785 | A | 2/2005 | |
| JP | 2005-056602 | A | 3/2005 | |
| JP | 2005-093371 | * | 4/2005 | H01M 10/40 |
| JP | 2005-093371 | A | 4/2005 | |
| JP | 2005-129489 | A | 5/2005 | |
| JP | 2005-158737 | A | 6/2005 | |
| WO | 01/92158 | A1 | 12/2001 | |
| WO | WO 01/92158 | * | 12/2006 | C01G 51/00 |

OTHER PUBLICATIONS

Cobalt USGS Survey Statistics 2005 {http://minerals.usgs.gov/ds/2005/140/ds140-cobal.pdf} Updated Dec. 18, 2012.*
Magnesium USGS Survey Statistics 2005 {http://minerals.usgs.gov/ds/2005/140/ds140-mgmet.pdf} Updated Oct. 25, 2012.*
Niobium USGS Survey Statistics 2005 {http://minerals.usgs.gov/ds/2005/140/ds140-niobi.pdf} Updated Oct. 5, 2012.*
Cobalt USGS Survey Statistics 2005 (http://minerals.usgs.gov/ds/2005/140/ds140-cobal.pdf) Updated Dec. 18, 2012.
Magnesium USGS Survey Statistics 2005 (http://minerals.usgs.gov/ds/2005/140/ds140-mgmet.pdf) Updated Oct. 25, 2012.
Niobium USGS Survey Statistics 2005 (http://minerals.usgs.gov/ds/2005/140/ds140-niobi.pdf) Updated Oct. 5, 2012.
International Searching Authority, International Preliminary Report on Patentability of PCT/JP2006/315187 issued on May 2, 2008.

* cited by examiner

*Primary Examiner* — Patrick Ryan
*Assistant Examiner* — Aaron Greso
(74) *Attorney, Agent, or Firm* — Sughrue Mion, PLLC

(57) ABSTRACT

The present invention provides a nonaqueous electrolyte battery that exhibits high energy density and excellent cycle characteristics, as well as a cathode for use in such a battery, and a cathode active material for use in such a cathode. The cathode active material of the present invention has a composition represented by the formula (1) and a crystallite size in the (110) plane of not smaller than 85 nm:

$$Li_xCo_{1-y-z}Nb_yM_zO_2 \qquad (1)$$

wherein M stands for at least one element selected from Mg, Y, rare earth elements, Ti, Zr, Hf, V, Ta, Cr, Mo, W, Mn, Fe, Ni, Cu, Zn, B, Al, Ga, C, Si, Sn, N, S, F, and Cl; and $0.9 \leq x \leq 1.1$, $0.0002 \leq y \leq 0.01$, and $0 \leq z \leq 0.05$.

6 Claims, 3 Drawing Sheets

POSITIVE ELECTRODE ACTIVE MATERIAL, POSITIVE ELECTRODE FOR NONAQUEOUS ELECTROLYTE BATTERY, AND NONAQUEOUS ELECTROLYTE BATTERY

This is a continuation of application Ser. No. 11/997,480 filed Mar. 11, 2008, which is a 371 National Stage Entry of International Application No. PCT/JP2006/315187 filed Aug. 1, 2006, which claims priority of Japanese Patent Application No. 2006-030428 filed Feb. 8, 2006 and Japanese Patent Application No. 2005-248378 filed Aug. 1, 2005, the contents of all of which are incorporated herein by reference in their entirety.

FIELD OF ART

The present invention relates to a cathode active material for nonaqueous electrolyte batteries, such as lithium ion rechargeable batteries, a cathode for nonaqueous electrolyte batteries, and a nonaqueous electrolyte battery.

BACKGROUND ART

Lithium ion rechargeable batteries as a nonaqueous electrolyte battery are widely used in portable electronic devices, such as video cameras, mobile phones, and notebook computers, which have been becoming smaller, lighter, and more powerful. The batteries are also expected to be used in hybrid and electronic vehicles. For such applications, it is recently an important problem to improve the energy density of the batteries.

In order to solve this problem, it is conceivable to increase the maximum charging voltage and the discharge voltage. For lithium ion rechargeable batteries employing $LiCoO_2$ as a cathode active material, the current maximum charging voltage is about 4.2 V vs lithium. At a higher charging voltage of beyond 4.2 V, the amount of deintercalated lithium is excessive, which increases crystal strain of the cathode active material, resulting in collapse of the crystal structure. Thus, it is necessary not only to raise the maximum charging voltage, but also to improve stability of the crystal structure in the charged state, for preventing deterioration of discharge capacity and cycle characteristics.

For improving stability at high voltage of the crystal structure of $LiCoO_2$ as a cathode active material, it is proposed to substitute part of Co with one or more different elements. For example, Patent Publication 1 proposes a cathode active material wherein part of Co is substituted with Mg and M representing at least one element selected from the group consisting of Al, Ti, Sr, Mn, Ni, and Ca. Patent Publication 2 proposes a cathode active material wherein part of Co is substituted with elements of groups IV-A and II-A. Patent Publication 3 proposes a cathode active material that withstands high voltage and has high capacity and excellent cycle characteristics, wherein part of Co is substituted with A representing at least one element selected from the group consisting of Ti, Ta, and Nb, and B representing at least one element selected from the group consisting of Al, Fe, Ni, Y, Zr, W, Mn, In, Sn, and Si. Patent Publication 4 proposes a cathode active material that has high capacity and excellent low-temperature properties, wherein part of Co may be substituted with M representing at least one element selected from the group consisting of Ta, Ti, Nb, Zr, and Hf.

The proposed cathode active materials, however, do not have sufficient stability of $LiCoO_2$ crystal structure. Batteries having high energy density and excellent cycle characteristics are yet to be obtained.

Patent Publication 1: JP-2004-220952-A
Patent Publication 2: JP-2005-50779-A
Patent Publication 3: JP-2001-351624-A
Patent Publication 4: WO-01-027032-A

SUMMARY OF THE INVENTION

It is an object of the present invention to provide a nonaqueous electrolyte battery that exhibits, even at a maximum charging voltage of about 4.2 V, high energy density and excellent cycle characteristics, and at an increased maximum charging voltage of about 4.6 V, exhibits high energy density and still more excellent cycle characteristics, as well as a cathode for the nonaqueous electrolyte battery and a cathode active material for the cathode.

It is another object of the present invention to provide a nonaqueous electrolyte battery that exhibits high energy density, excellent cycle characteristics, and also excellent thermal stability, as well as a cathode for the nonaqueous electrolyte battery and a cathode active material for the cathode.

According to the present invention, there is provided a cathode active material of a composition represented by the formula (1) having a crystallite size in the (110) plane of not smaller than 85 nm:

$$Li_xCo_{1-y-z}Nb_yM_zO_2 \qquad (1)$$

wherein M stands for at least one element selected from Mg, Y, rare earth elements, Ti, Zr, Hf, V, Ta, Cr, Mo, W, Mn, Fe, Ni, Cu, Zn, B, Al, Ga, C, Si, Sn, N, S, F, and Cl; and $0.9 \leq x \leq 1.1$, $0.0002 \leq y \leq 0.01$, and $0 \leq z \leq 0.05$.

According to the present invention, there is also provided a cathode for a nonaqueous electrolyte battery comprising the above cathode active material.

According to the present invention, there is also provided a nonaqueous electrolyte battery comprising the above cathode for a nonaqueous electrolyte battery.

According to the present invention, there is further provided use of the above cathode active material in the manufacture of a cathode for a nonaqueous electrolyte battery.

Utilizing the cathode active material having the above-mentioned structure, the nonaqueous electrolyte battery and the cathode for the nonaqueous electrolyte battery according to the present invention exhibit high energy density and excellent cycle characteristics. The cathode active material according to the present invention is extremely useful in product ion of a cathode for nonaqueous electrolyte batteries.

Figure 3:
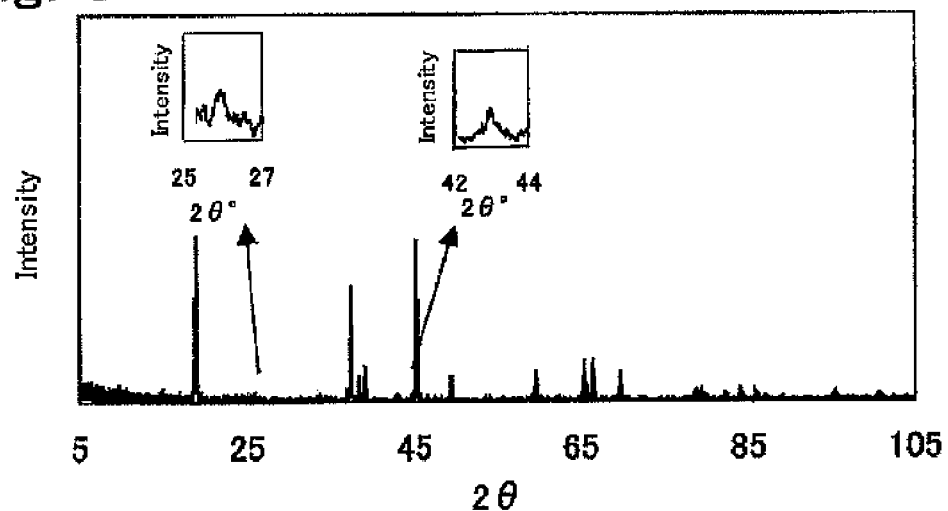

FIG. 3 is a graph showing the X-ray diffraction spectrum of the cathode active material prepared in Comparative Example 3.

Figure 4:
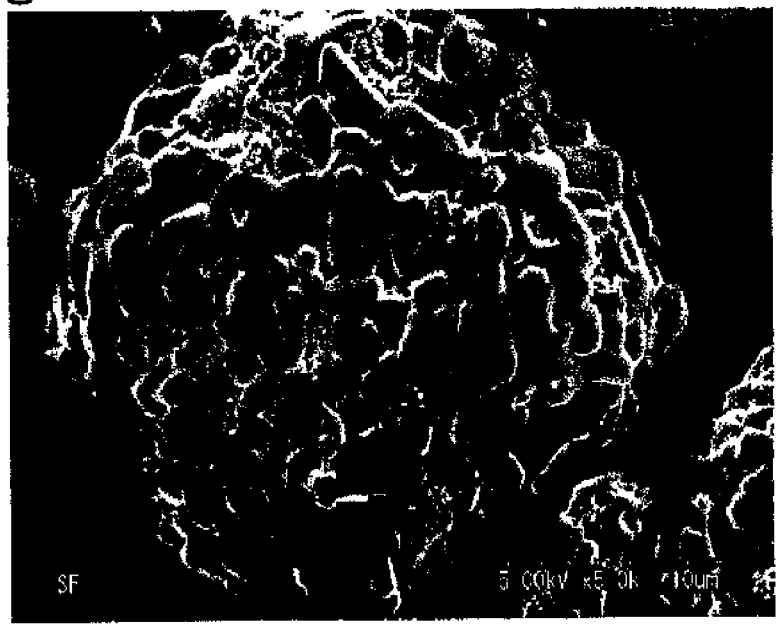

FIG. 4 is a copy of a SEM image at ×5000 magnification of the cathode active material prepared in Comparative Example 3.

Figure 5:
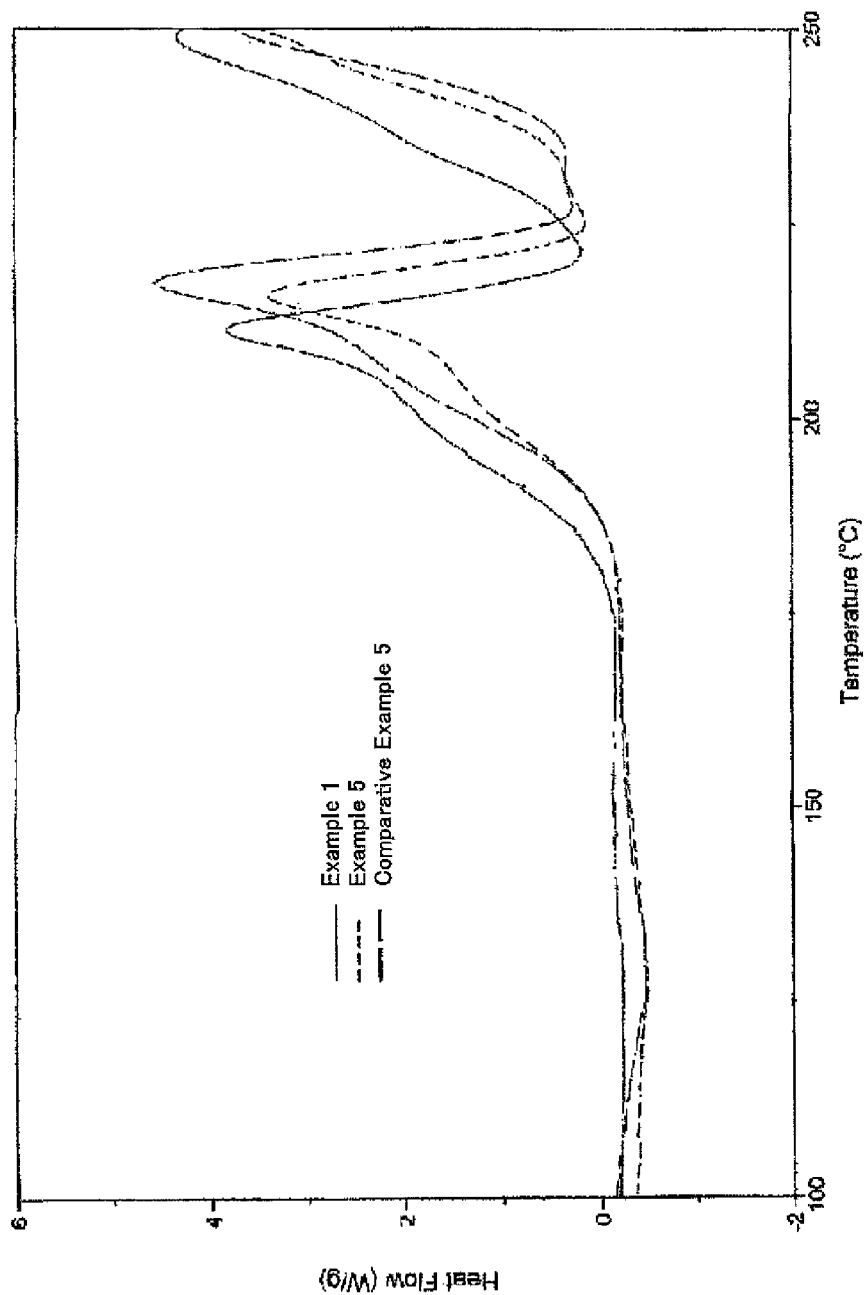

FIG. 5 is a graph showing the results of differential scanning calorimetry of the cathode active materials prepared in Example 1, Example 5, and Comparative Example 5.

PREFERRED EMBODIMENTS OF THE INVENTION

The present invention will now be explained in more detail.

The cathode active material according to the present invention has a composition represented by the formula (1) mentioned above.

In the formula (1), M stands for at least one element selected from Mg, Y, rare earth elements, Ti, Zr, Hf, V, Ta, Cr, Mo, W, Mn, Fe, Ni, Cu, Zn, B, Al, Ga, C, Si, Sn, N, S, F, and Cl.

In the formula (1), x denotes the amount of Li upon synthesis of the cathode active material, and is $0.9 \leq x \leq 1.1$. With x within this range, the cathode active material is given a $LiCoO_2$ single phase structure. When a battery is produced with the cathode active material and subjected to charging/discharging, the amount of Li varies due to intercalation and deintercalation.

In the formula (1), y denotes the amount of Nb, and is $0.0002 \leq y \leq 0.01$. It is not known in detail how Nb is present and functions in the cathode active material, but substituting part of Co with Nb and making the crystallite size in the (110) phase fall within the particular range as will be discussed later, stabilize the crystal structure. Thus, using such a cathode active material in a cathode of a nonaqueous electrolyte battery, high energy density and excellent cycle characteristics may be achieved even at a maximum charging voltage of about 4.2 V. Further, at an increased maximum charging voltage of about 4.6 V, still more excellent energy density and cycle characteristics may be achieved.

In the cathode active material according to the present invention, it is preferred that Nb is present in such a state that no peak corresponding to the secondary phase (an oxide of Nb or a Li—Nb composite oxide) is observed in X-ray diffraction. Further, it is preferred that uneven distribution of Nb in a cross-section of the cathode active material is not observed with EPMA (Electron Probe Micro Analyzer) at ×1000 magnification. If y is less than 0.0002, the effect of Nb to stabilize the crystal structure is not exhibited sufficiently. If y is more than 0.01, the secondary phase is precipitated, the effect of Nb to stabilize the crystal structure is not exhibited sufficiently, the capacity is lowered, and the internal resistance is increased. y is preferably $0.0005 \leq y < 0.005$, more preferably $0.001 \leq y < 0.005$. With y within these ranges, no peak corresponding to the secondary phase is observed in X-ray diffraction, and uneven distribution of Nb in a cross-section is not observed with EPMA, which result in stabilized crystal structure and high capacity.

In the formula (1), M stands for one or more elements selected from Mg, Y, rare earth elements, Ti, Zr, Hf, V, Ta, Cr, Mo, W, Mn, Fe, Ni, Cu, Zn, B, Al, Ga, C, Si, Sn, N, S, F, and Cl. For example, when M is Mg, thermal stability is greatly improved. Addition of Mg as M, compared to addition of only Nb, results in a synergistic effect that the average discharge voltage is increased at a higher maximum charging voltage.

z denotes the amount of M, and is $0 \leq z \leq 0.05$. The cathode active material according to the present invention does not necessarily contain M. However, M may be contained for the purpose of improving various battery properties, or as inevitable impurities. If z is more than 0.05, the secondary phase is precipitated, which causes decrease in capacity. The balance of various battery properties being considered, it is preferred that M is Mg and z is $0.005 \leq z \leq 0.02$.

The cathode active material according to the present invention has a crystallite size in the (110) plane of not smaller than 85 nm.

In the present invention, the crystallite size in the (110) plane is calculated according to the Scherrer formula from the peak near $2\theta = 66.5 \pm 1°$ in X-ray diffract ion spectrum determined by means of an X-ray diffractometer (RINT2000 manufactured by RIGAKU CORPORATION) with CuKα radiation. With the crystallite size in the (110) plane of not smaller than 85 nm, the crystal structure is stable. Addition of Nb results in the tendency for the crystallite size in the (110) plane to decrease due to suppressed growth of the primary particles, so that it is necessary to control the starting materials and manufacturing conditions for achieving the size of not smaller than 85 nm. If the crystallite size in the (110) plane is less than 85 nm, the crystal structure is unstable during charging, which deteriorates discharge capacity and cycle characteristics.

The cathode active material according to the present invention may be prepared, for example, by mixing a Li compound as a Li source, a Co compound as a Co source, a Nb compound as a Nb source, and optionally an M compound as an M source, and calcining the resulting mixture under appropriate conditions.

Examples of the Li compound may include inorganic salts, such as lithium hydroxide, lithium chloride, lithium nitrate, lithium carbonate, and lithium sulfate; and organic salts, such as lithium formate, lithium acetate, and lithium oxalate.

Examples of the Co compound may include oxide, hydroxide, carbonate, and oxyhydroxide of cobalt. Among these, cobalt oxide is preferred, and particularly preferred is cobalt oxide in the form of spheres having an average primary particle size of 50 to 200 nm and an average secondary particle size of 5 to 20 μm. Use of such spherical oxide particles as a starting material remarkably improves the reactivity with Nb to suppress segregation of Nb in the particles, and to achieve the crystallite size in the (110) plane of not smaller than 85 nm.

The oxide in the form of spheres may be prepared, for example, by introducing an aqueous solution of a Co compound and an alkaline aqueous solution into a reaction vessel under stirring at constant temperature and pH to prepare a hydroxide in the form of spheres, and calcining the hydroxide.

In the preparation of the hydroxide, a complexing agent, such as an ammonium salt, may suitably be added into the reaction vessel.

The calcination of the spherical hydroxide thus obtained may be performed usually at 300 to 800° C. for 1 to 24 hours. This step may also be performed by preliminary calcination at a temperature lower than the intended temperature, followed by raising up to the intended temperature, or by calcination at the intended temperature, followed by annealing at a lower temperature.

The sizes of the primary and secondary particles of the spherical oxide may easily be controlled by adjusting the concentration of the aqueous solution of a Co compound, the concentration of the alkaline aqueous solution, the adding rate of these solutions, the pH and temperature in the reaction vessel, the concentration of the complexing agent, as well as the conditions of calcination of the resulting hydroxide.

In this way, the oxide in the form of spheres having an average primary particle size of 50 to 200 nm and an average secondary particle size of 5 to 20 μm may be obtained, which is suitable as a Co source.

Examples of the Nb compound may include niobium oxide, preferably $Nb_2O_5$. Since the content of Nb is a trace amount, it is necessary to uniformly disperse Nb in mixing with the Li compound and the Co compound. Otherwise, Nb may be segregated or the secondary phase may precipitate after the calcination. For improved dispersibility, the average particle size of the Nb compound is preferably 1 to 5 μm.

Examples of the M compound may include, though varying depending on the selected element, oxides, hydroxides, carbonates, sulfates, nitrates, and halides containing M, and gases containing M.

For preparing the cathode active material of the present invention, first, for example, the Li compound, the Co compound, the Nb compound, and optionally the M compound are respectively measured out and mixed. The mixing may be performed in a ball mill or the like according to a known method, but it is preferred to use a high-speed stirring mixer in order to improve dispersibility.

Next, the mixture thus obtained is calcined. The calcination may be performed in a bogie hearth furnace, a kiln furnace, a mesh belt furnace, or the like, according to a known method, usually at higher than 1000° C. for 1 to 24 hours. Preferred calcination temperature is 1030 to 1050° C. At 1000° C. or lower, the crystallite size in the (110) plane may not be ensured to be not smaller than 85 nm.

The calcination may also be performed by preliminary calcination at a temperature lower than the above-mentioned calcination temperature, followed by raising up to the calcination temperature, or by calcination at the above-mentioned calcination temperature, followed by annealing at a lower temperature. The preliminary calcination or the annealing may be performed usually at 500 to 800° C. for about 30 minutes to about 6 hours.

The cathode active material according to the present invention may alternatively be prepared by mixing a Li compound and a composite compound prepared by coprecipitation of Co, Nb, and optionally M, and calcining the resulting mixture.

The cathode for a nonaqueous electrolyte battery according to the present invention contains the cathode active material of the present invention discussed above.

The cathode of the present invention may be prepared by a known method, using the cathode active material of the present invention as a cathode active material. For example, the cathode may be prepared by mixing the cathode active material, an electrically conductive material, a binder, and the like with an organic solvent, applying the resulting paste to a collector, drying, rolling, and cutting into a predetermined size. The electrically conductive material, the binder, the organic solvent, and the collector may be known products.

Examples of the electrically conductive material may include carbonaceous materials, such as natural graphite, artificial graphite, Ketjen black, and acetylene black.

Examples of the binder may include fluororesins, such as polytetrafluoroethylene and polyvinylidene fluoride, polyvinyl acetate, polymethyl methacrylate, ethylene-propylene-diene copolymer, styrene-butadiene copolymer, acrylonitrile-butadiene copolymer, and carboxymethyl cellulose.

Examples of the organic solvent may include N-methylpyrrolidone, tetrahydrofuran, ethylene oxide, methyl ethyl ketone, cyclohexanone, methyl acetate, methyl acrylate, diethyltriamine, dimethylformamide, and dimethylacetamide.

Examples of the collector may include metal foils, such as Al, Cu, and stainless steel foils.

The cathode active material used in the cathode of the present invention may be the cathode active material of the present invention mixed with a known cathode active material for achieving desired battery properties. For example, a cathode active material composed mainly of Ni, such as $LiNiO_2$, may be admixed to improve the discharge capacity, or $LiNi_{1/3}Co_{1/3}Mn_{1/3}O_2$ may be admixed to improve safety.

The nonaqueous electrolyte battery according to the present invention is provided with the cathode for a nonaqueous electrolyte battery according to the present invention.

The constituent components of the nonaqueous electrolyte battery of the present invention other than the cathode may be of known structures. The nonaqueous electrolyte battery of the present invention is composed mainly of, for example, a cathode, an anode, an organic solvent, an electrolyte, and a separator. The organic solvent and the electrolyte may be replaced with a solid electrolyte.

In the anode, an anode active material is contained, such as a lithium metal, a lithium alloy, or a carbonaceous material. A binder, a collector, and the like, which are similar to those for the cathode, are optionally used. Examples of the carbonaceous material may include amorphous carbon, such as soft carbon and hard carbon, artificial graphite, and natural graphite.

Examples of the organic solvent may include carbonates, such as propylene carbonate, ethylene carbonate, dimethyl carbonate, diethyl carbonate, and ethyl methyl carbonate; ethers, such as 1,2-dimethoxypropane, 1,3-dimethoxypropane, tetrahydrofuran, and 2-methyltetrahydrofuran; esters, such as methyl acetate and γ-butyrolactone; nitriles, such as acetonitrile and butylonitrile; and amides, such as N,N-dimethylformamide and N,N-dimethylacetamide.

Examples of the electrolyte may include $LiClO_4$, $LiPF_6$, and $LiBF_4$.

Examples of the solid electrolyte may include polymer electrolytes, such as polyethylene oxide electrolyte; and sulfate electrolytes, such as $Li_2S$—$SiS_2$, $Li_2S$—$P_2S_5$, and $Li_2S$—$B_2S_3$. Alternatively, a so-called gel-type electrolyte, wherein a nonaqueous electrolyte solution is retained in a polymer, may also be used.

Examples of the separator may include porous polymer membranes, such as of polyethylene or polypropylene.

The nonaqueous electrolyte battery according to the present invention may take various shapes, such as cylindrical, laminated, and coin shapes. In any shape, the nonaqueous electrolyte battery of the present invention may be fabricated by placing the above-mentioned constituent components in a battery case, connecting the cathode and the anode to a cathode terminal and an anode terminal, respectively, with collector leads, and sealing the battery case.

EXAMPLES

The present invention will now be explained in more detail with reference to Examples and Comparative Examples, which are not intended to limit the present invention.

Example 1

500 ml of an aqueous solution of cobalt sulfate with a Co content of 1 mol/l and 1000 ml of a 1 mol/l aqueous solution of sodium hydroxide were introduced into a reaction vessel under stirring so as to be at 50° C. and pH 8 to 12. After the introduction, the mixture was stirred continuously, and maintained at 50° C. for 10 hours for ageing. Then the resulting precipitate was taken out by filtration, and calcined in a box-shaped electric furnace at 300° C. for 5 hours to obtain cobalt oxide in the form of spheres. The major axis of more than 100 arbitrarily-selected primary particles of the spherical cobalt oxide thus obtained was measured using a ×5000 SEM image. It was determined that the average primary particle size represented as an average value of the major axis was 100 nm. The average secondary particle size (D50) determined by laser diffraction was 16 μm.

Figure 1:
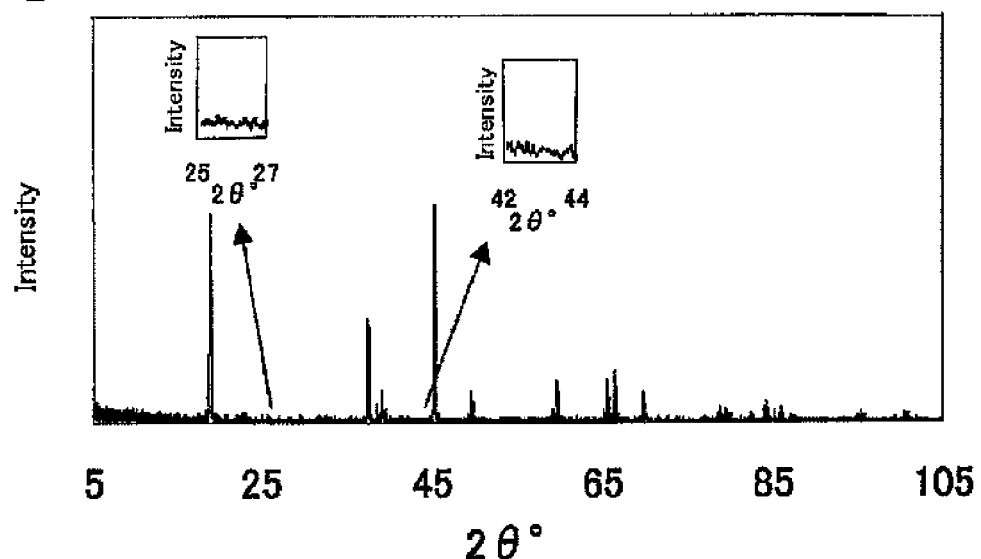
FIG. 1 is a graph showing the X-ray diffraction spectrum of the cathode active material prepared in Example 1.

The spherical cobalt oxide prepared above, lithium carbonate, and niobium oxide having an average particle size (D50) of 2 μm were measured out at a ratio of Li:Co:Nb=1:0.9990:0.0010, and mixed in a high-speed stirring mixer. The resulting mixture was calcined in a box-shaped electric furnace at 1010° C. for 6 hours to obtain a cathode active material. The X-ray diffraction spectrum of this cathode active material determined with CuKα radiation is shown in FIG. 1.

Figure 2:
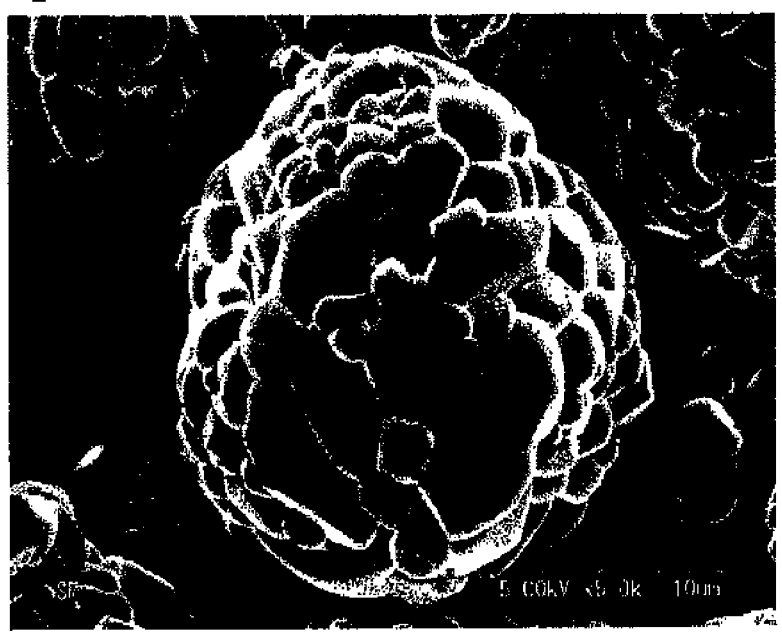
FIG. 2 is a copy of a SEM image at ×5000 magnification of the cathode active material prepared in Example 1.

The result was that only a diffraction peak corresponding to the hexagonal system was observed. The crystallite size determined from the diffraction peak in the (110) plane was 87.3 nm. The cathode active material was observed under SEM at ×5000 magnification. A copy of the SEM image is shown in FIG. 2. Further, a cross-section of the cathode active material was observed with EPMA at ×1000 magnification to confirm that Nb was not unevenly distributed in any particles.

The cathode active material thus obtained, acetylene black as an electrically conductive material, and polyvinylidene fluoride as a binder were mixed at a ratio of 93:2:5 by mass, and kneaded with N-methylpyrrolidone into a paste. The paste was applied onto aluminum foil of 20 μm thick, dried, and pressure molded in a press. The resulting product was cut into a predetermined size, and terminals were spot-welded thereto to produce a cathode. On the other hand, lithium foil was fixed to stainless steel mesh by pressing, and terminals were spot-welded thereto to produce an anode. An electrode prepared in the same way as the anode was used as a reference electrode. These electrodes were placed in a glass container with their terminals projecting from each electrode, and an electrolyte prepared by dissolving lithium perchlorate in a 1:1 (by volume) mixture of ethylene carbonate and ethyl methyl carbonate at 1 mol/l, was introduced into the container to produce a nonaqueous electrolyte battery.

The battery was subjected to charging/discharging at 1 C (C=150 mA/g) between the maximum charging voltage of 4.3 V and the minimum discharging voltage of 3V vs the reference electrode. Then the discharge capacity and the average discharge voltage per 1 g of the cathode active material at the first cycle were taken as the initial capacity and the initial discharge voltage, respectively. It was determined that the initial capacity of this battery was 152 mAh/g, and the initial discharge voltage was 3.84 V. The discharge rate at the 20th cycle of charging/discharging under the same conditions, divided by the initial capacity, was taken as a cycle capacity characteristics value. Similarly, the average discharge voltage at the 20th cycle divided by the initial discharge voltage was taken as a cycle voltage characteristics value. The cycle capacity characteristics value of this battery was 96.2% and the cycle voltage characteristics value was 98.0%. The results are shown in Table 2.

On the other hand, the initial capacity, the initial discharge voltage, the cycle capacity characteristics value, and the cycle voltage characteristics value of the battery were determined by performing charging/discharging under the same conditions as above, except that the maximum charging voltage was 4.5 V. In this case, the initial capacity was 180 mAh/g, the initial discharge voltage was 3.92 V, the cycle capacity characteristics value was 83.9%, and the cycle voltage characteristics value was 88.5%. The results are shown in Table 3.

The average discharge voltage at the second cycle of charging/discharging under the same conditions as above, except that the maximum charging voltage was 4.6 V, was taken as a 4.6 V average discharge voltage. The 4.6 V average discharge voltage of this battery was 3.93 V. The result is shown in Table 1.

The cathode was taken out from the battery that had been charged to 4.3 V, and cut into a predetermined size to prepare a cathode piece. This cathode piece was sealed in an aluminum measuring cell together with the electrolyte discussed above. The cell was pierced for degassing. The measuring cell thus produced was subjected to differential scanning calorimetry in a DSC (differential scanning calorimetry) system at the temperature-raising rate of 5° C./min from the room temperature up to 300° C. The results are shown in FIG. 5.

Examples 2-4

A cathode active material, a cathode, and a nonaqueous electrolyte battery were prepared in the same way as in Example 1, using cobalt oxide in the form of spheres, lithium carbonate, and niobium oxide at each composition shown in Table 1. The crystallite size in the (110) plane of the obtained cathode active material and the battery properties of the nonaqueous electrolyte battery thus produced were determined in the same way as in Example 1. The results are shown in Tables 1 to 3.

Examples 5 and 6

A cathode active material, a cathode, and a nonaqueous electrolyte battery were prepared in the same way as in Example 1, using cobalt oxide in the form of spheres, lithium carbonate, niobium oxide, and magnesium hydroxide at each composition shown in Table 1. The magnesium hydroxide used here had an average particle size (D50) of 4 μm.

The crystallite size in the (110) plane of the obtained cathode active material and the battery properties of the nonaqueous electrolyte battery thus produced were determined in the same way as in Example 1. The results are shown in Tables 1 to 3. The results of differential scanning calorimetry of the cathode active material prepared in Example 5 are shown in FIG. 5. It was confirmed that addition of Mg caused the exothermic peak to generally shift to the higher-temperature side, indicating improvement in thermal resistance.

Comparative Examples 1-3

A cathode active material, a cathode, and a nonaqueous electrolyte battery were prepared in the same way as in Example 1, using cobalt oxide in the form of spheres, lithium carbonate, and niobium oxide at each composition shown in Table 1. The crystallite size in the (110) plane of the obtained cathode active material and the battery properties of the nonaqueous electrolyte battery thus produced were determined in the same way as in Example 1. The results are shown in Tables 1 to 3.

The X-ray diffraction spectrum of the cathode active material prepared in Comparative Example 3 are shown in FIG. 3, wherein a diffract ion peak corresponding to Nb oxide was confirmed in addition to the peak corresponding to the hexagonal system. Further, the cathode active material prepared in Comparative Example 3 was observed under SEM at ×5000 magnification. A copy of the SEM image is shown in FIG. 4, wherein precipitate, which is believed to be Nb oxide, was observed.

Comparative Example 4

A cathode active material, a cathode, and a nonaqueous electrolyte battery were prepared in the same way as in Example 1, except that the calcination of the mixture at 1010° C. for 6 hours in Example 1 was changed to calcination at 900° C. for 6 hours. The crystallite size in the (110) plane of the obtained cathode active material and the battery properties of the nonaqueous electrolyte battery thus produced were determined in the same way as in Example 1. The results are shown in Tables 1 to 3.

Comparative Example 5

A cathode active material, a cathode, and a nonaqueous electrolyte battery were prepared in the same way as in Example 1, using cobalt oxide in the form of spheres, lithium carbonate, and magnesium hydroxide at the composition shown in Table 1, except that the calcination of the mixture at 1010° C. for 6 hours in Example 1 was changed to calcination at 990° C. for 6 hours. The magnesium hydroxide used here had an average particle size (D50) of 4 μm.

The crystallite size in the (110) plane of the obtained cathode active material and the battery properties of the nonaqueous electrolyte battery thus produced were determined in the same way as in Example 1. The results are shown in Tables 1 to 3. The results of differential scanning calorimetry are shown in FIG. 5. From FIG. 5, it was found that rising of an exothermic peak was observed at approximately the same temperature as in Example 5.

From the results of measurements in Examples and Comparative Examples, it is understood that control of the crystallite size in the (110) plane, in addition to the content of Nb, to fall within the range according to the present invention resulted in improvement in various battery properties at the maximum charging voltage of 4.3 V, moreover at 4.5 V or 4.6 V. On the other hand, it is also understood that control of the Nb content, in addition to the crystallite size in the (110) plane, to fall within the range according to the present invention resulted in improvement in various battery properties at the maximum charging voltage of 4.3 V, moreover at 4.5 V or 4.6 V. It is further understood that addition of Mg together with Nb resulted in improvement in not only various battery properties but also thermal stability at the maximum charging voltage of 4.3 V or 4.5 V, moreover at 4.6 V.

TABLE 1

|  | Li | Co | Nb (value of y) | Mg (value of z) | Crystallite size (Å) | 4.6 V Average discharge voltage (V) |
|---|---|---|---|---|---|---|
| Example 1 | 1 | 0.9990 | 0.0010 | 0 | 873 | 3.93 |
| Example 2 | 1 | 0.9995 | 0.0005 | 0 | 911 | 3.87 |
| Example 3 | 1 | 0.9900 | 0.0100 | 0 | 853 | 3.92 |
| Example 4 | 1 | 0.9960 | 0.0040 | 0 | 864 | 3.93 |
| Example 5 | 1 | 0.9890 | 0.0010 | 0.0100 | 1008 | 3.97 |
| Example 6 | 1 | 0.9490 | 0.0010 | 0.0500 | 890 | 3.97 |
| Comp. Ex. 1 | 1 | 0.9999 | 0.0001 | 0 | 1046 | 3.80 |
| Comp. Ex. 2 | 1 | 1.0000 | 0 | 0 | 1038 | 3.82 |
| Comp. Ex. 3 | 1 | 0.9800 | 0.0200 | 0 | 791 | 3.84 |
| Comp. Ex. 4 | 1 | 0.9990 | 0.0010 | 0 | 840 | 3.81 |
| Comp. Ex. 5 | 1 | 0.9900 | 0 | 0.0100 | 917 | 3.79 |

TABLE 2

|  | Initial capacity (mAh/g) | Cycle capacity characteristics value (%) | Initial voltage (V) | Cycle voltage characteristics value (%) |
|---|---|---|---|---|
| Example 1 | 152 | 96.2 | 3.84 | 98.0 |
| Example 2 | 149 | 95.7 | 3.84 | 97.5 |
| Example 3 | 141 | 94.8 | 3.83 | 96.6 |
| Example 4 | 149 | 95.3 | 3.84 | 97.1 |
| Example 5 | 150 | 94.5 | 3.91 | 96.8 |
| Example 6 | 140 | 94.8 | 3.84 | 95.9 |
| Comp. Ex. 1 | 148 | 90.0 | 3.80 | 91.7 |
| Comp. Ex. 2 | 149 | 91.3 | 3.82 | 92.9 |
| Comp. Ex. 3 | 129 | 93.5 | 3.82 | 95.2 |
| Comp. Ex. 4 | 147 | 90.5 | 3.80 | 92.2 |
| Comp. Ex. 5 | 148 | 93.7 | 3.83 | 95.3 |

TABLE 3

|  | Initial capacity (mAh/g) | Cycle capacity characteristics value (%) | Initial voltage (V) | Cycle voltage characteristics value (%) |
|---|---|---|---|---|
| Example 1 | 180 | 83.9 | 3.92 | 88.5 |
| Example 2 | 177 | 80.2 | 3.91 | 84.6 |
| Example 3 | 168 | 82.9 | 3.91 | 87.0 |
| Example 4 | 177 | 83.5 | 3.92 | 87.7 |
| Example 5 | 177 | 82.3 | 3.91 | 87.5 |
| Example 6 | 166 | 80.3 | 3.91 | 83.5 |
| Comp. Ex. 1 | 175 | 70.2 | 3.88 | 74.0 |
| Comp. Ex. 2 | 176 | 65.3 | 3.89 | 79.4 |
| Comp. Ex. 3 | 152 | 72.3 | 3.89 | 75.9 |
| Comp. Ex. 4 | 173 | 71.5 | 3.88 | 75.1 |
| Comp. Ex. 5 | 174 | 74.8 | 3.83 | 79.7 |

What is claimed is:

1. A cathode active material of a composition represented by the formula (1) having a crystallite size in the (110) plane of not smaller than 85 nm:

$$Li_xCo_{1-y-z}Nb_yM_zO_2 \qquad (1)$$

wherein M stands for Mg, and $0.9 \leq x \leq 1.1$, $0.0002 \leq y \leq 0.01$, and $0 < z \leq 0.05$, wherein said cathode active material is obtained by calcination of a mixture of a Li compound, a Co compound, a Nb compound, and a Mg compound at a temperature of higher than 1000° C.

2. The cathode active material according to claim 1, wherein y is $0.0005 \leq y \leq 0.005$.

3. The cathode active material according to claim 1, wherein y is $0.001 \leq y \leq 0.005$.

4. The cathode active material according to claim 1, wherein z is $0.005 \leq z \leq 0.02$.

5. A cathode for a nonaqueous electrolyte battery comprising a cathode active material of claim 1.

6. A nonaqueous electrolyte battery comprising a cathode for a nonaqueous electrolyte battery of claim 5.

* * * * *